May 17, 1966  R. E. SPOKES ETAL  3,251,724
BEARINGS

Filed Aug. 2, 1961  3 Sheets-Sheet 1

INVENTORS.
Ray E. Spokes
John H. Troester
By Wallace, Kinzer and Dorn
ATTORNEYS

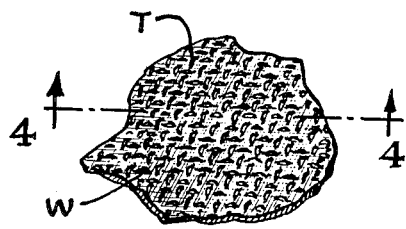
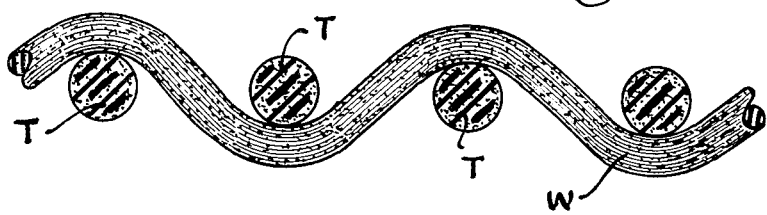
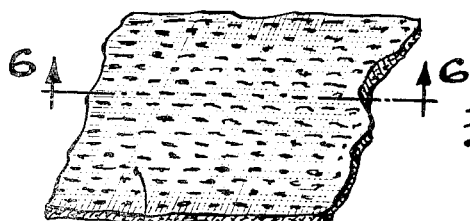
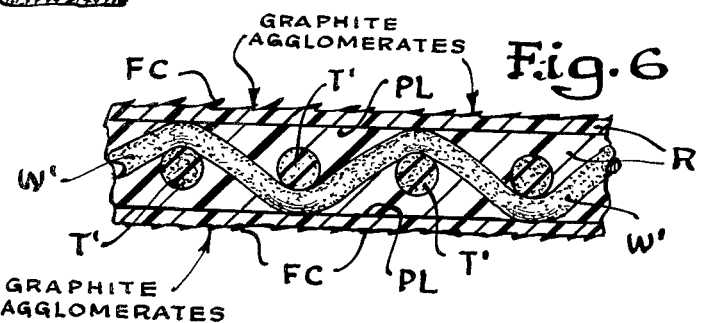
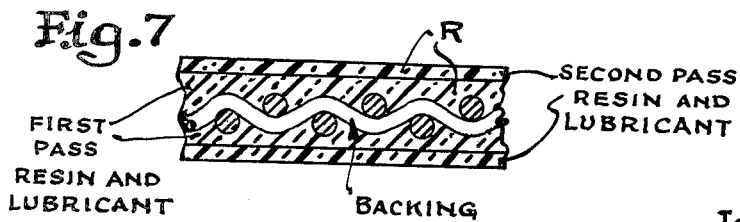

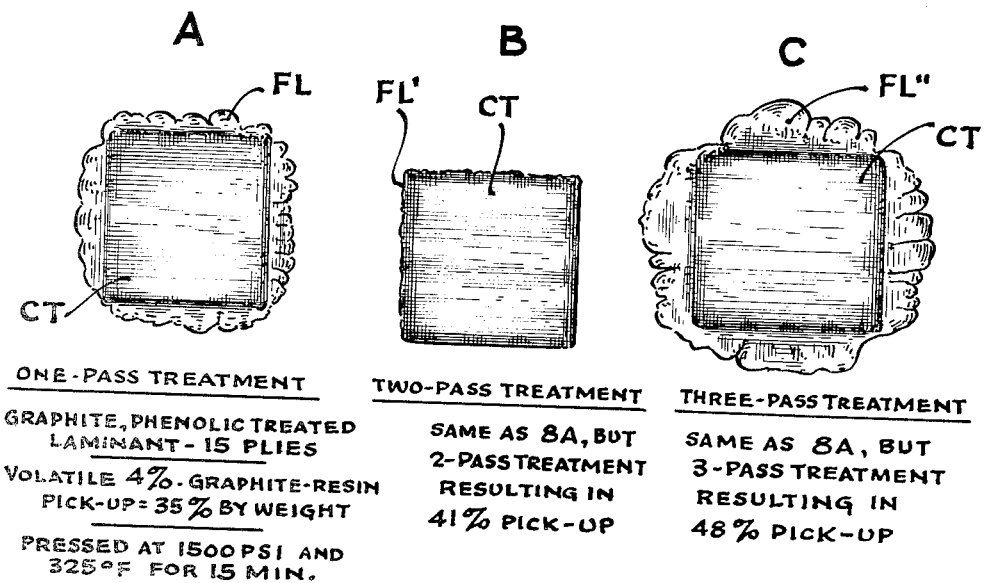

United States Patent Office 3,251,724
Patented May 17, 1966

3,251,724
BEARINGS
Ray E. Spokes, Ann Arbor, Mich., and John H. Troester, Winchester, Va., assignors to American Brake Shoe Company, New York, N.Y., a corporation of Delaware
Filed Aug. 2, 1961, Ser. No. 128,825
3 Claims. (Cl. 156—315)

This invention relates to composition bearings composed of fabric impregnated with a resinous binder material.

This application is a continuation-in-part of application Serial No. 555,017, filed December 23, 1955, now abandoned.

A common form of bearing is one composed of fabric material bonded into a unitary body by a heat settable binder such as thermosetting phenolic resin. These bearings have sometimes been lubricated by water, but it would be advantageous in some circumstances to embody effective self-lubricating properties in fabric bearings were this to be possible. Particulated graphite has been heretofore suggested for this purpose, and molybdenum disulfide is usable also. The difficulty is, however, that the lubricant has to be added before the binder is cured under heat and pressure. During such cure, particularly in the instance of a thick, flocculated solid lubricant, the lubricant is caused to migrate or flow from an area of greater pressure to one of less producing bearing areas that are overly saturated with lubricant while other areas are practically void. Such migration does not occur with a thin lubricant of such consistency as to penetrate the fibers of the fabric, but then in this instance the lubricant is not so effective. Broadly, the object of the present invention is to enable fabric base bearings of the foregoing kind to be produced, containing a uniform surface coating of finely divided solid lubricant anchored against migration and present as a surface coating only on the surface of the fibers composing the fabric and in the interstices among the fibers. The solid lubricant under the present invention does not saturate or seep through the individual fibers composing the fabric to any marked degree.

One of the more common forms of fabric bearings is a laminated bearing wherein the layers are adapted to be bonded together by virtue of passing the web stock for the laminae through the binder in an uncured stage. The web thus treated with uncured binder is partially cured and then cut into strips. These partially cured strips are stacked and then subjected to heat and pressure in a mold to advance the binder to its final stage of cure so that the laminae are united into a dense, rigid body. In accordance with the present invention, it has been found that the load carrying capacity and wear properties of laminated fabric bearings and kindred fabric bearings can be materially enhanced and the bearing at the same time more uniformly loaded with solid lubricant such as lubricating graphite by treating the web stock in a novel multi-step procedure with binder and lubricant to produce thereon a surface or layer of flocculated solid lubricant; that is, the web from which the bearing is to be made is coated on the surface with uncured binder resin containing flocculated lubricant in one step, heated to cure the resin binder short of its infusible state, and then this is repeated. Next, the web is cut to obtain the fabric in the desired shape, such as individual laminae, and these are then molded and completely cured under heat and pressure. Such preliminary multi-step treating procedure accounts for a thick flocculated coating only at the surface of the fabric.

The present invention is not limited to a laminated bearing. Thus, bearings within the present invention may be made by convoluting the treated strip and then molding the convolution, or by mascerating a coated strip and then molding the mascreations. Whatever the specific form in which bearing is produced, such can be obtained in accordance with the present invention from web stock surface treated in at least two steps with a settable binder such as a thermosetting resin containing lubricant. By partially curing the binder after each surface treating step, the thick, flocculated lubricant will not flow objectionably when the strips, laminae, convolutes or mascerations made therefrom are molded under heat and pressure, and such is a further object of the invention. This two-step coating and partial cure procedure produces setting up of the first stage binder resin beyond that of the second stage resin. Since the major portions of the lubricant and binder resin are added in the first step as will be described, it will be realized that the additional cure of the resin first added in effect locks in the major lubricant content to prevent any flow thereof when the fabric is finally cured under pressure. The volatile content of the resin plays a role in this aspect of the invention as will be explained. The particular advantage occurring from this aside from preventing lubricant migration is that the resultant bearing displays good friction balance, that is, a good balance between static and dynamic friction, and the attainment of this good friction balance in the foregoing manner is a further object of the present invention.

It is to be emphasized that the solid lubricant afforded in the present instance is a distinct, relatively thick surface layer as will hereinafter be explained in connection with the drawings. The solid lubricant is not intended to penetrate or substantially impregnate the individual fabric yarns, and in fact little if any penetration is involved. This is different in kind for example from what is intended and accomplished in the instance of adjusting a liquid mixture or system to obtain a consistency that will assure penetration through the yarns of a fabric bearing in order that the internal yarn structure will be saturated with lubricant while the outer surfaces are surrounded by an envelope of solid lubricant. This is accomplished, for example, under Martello Patent No. 2,757,109, and it will be recognized that in such practices, represented by the Martello patent, there is no problem of a migratable or shiftable solid lubricant continuum since the individual solid lubricant particles are themselves well anchored within and in most instances are surrounded by the rovings embodied in the yarns.

The two kinds of lubricant manifestations thus contrasted are recognizably differences in kind, and that this is so can be realized further by noting that a bearing fabricated under the present invention is more resilient than a bearing fabricated from fabric wherein the yarns composing the fabric material are thoroughly and completely saturated and impregnated by solid lubricant and bonding resin of a water soluble type. Thus, a bearing produced under the latter procedure represents a relatively rigid structure because of the high degree with which the solid lubricant and bonding resin penetrates the fabric yarns, but under the present invention the bonding resin and solid lubricant particles do not penetrate or seep into the fabric yarns to any marked degree. Stated in other words, the fabric backing under the present invention receives at most only very little of the bonding resin as a penetrant or impregnant. As a consequence, a bearing under the present invention retains to a large degree the inherent resilience or yieldability of the bearing fabric material, and this enables a bearing under the present invention to conform or yield under thrusts to a much greater degree in comparison to a fabric bearing wherein the yarns are thoroughly saturated with bonding resin and lubricant solids.

It is sometimes desirable that a bearing of the foregoing kind be bonded in a fixed relation to a backing member. Several methods have heretofore been proposed for achieving this end, and these have included the provision of openings in the backing member serving to grip corresponding portions of the bearing attained by molding the bearing under heat and pressure against the backing member having such openings; the inter-position of a somewhat flimsy, uncured adhesive sheet between the backing member and the partially cured bearing followed by a heat cycle to set the adhesive and simultaneously complete the cure of the bearing; and thirdly, by the use of a coating of cement applied between the backing member and the finished bearing. In accordance with the present invention, the need for puncturing the backing member is eliminated, and also special handling of a delicate cementing sheet, and a more effective metal-to-fabric bond is achieved by first coating bare fabric that will later be used as the source for one of the outermost fabric layers comprising a multi-layer bearing, with an uncured cement composed of synthetic rubber and thermosetting resin. Thus, this outermost fabric layer not having the lubricated binder mentioned above is used to bond the laminae comprising the bearing.

Specifically, the object of the present invention is to produce bearings composed of fabric coated with a thermosetting resin containing very finely divided lubricant in a flocculated state, and to do this by passing the fabric web for the bearing in plural stages through liquid resin containing lubricant, the fabric stock being impregnated with about 35 percent by weight of lubricant and binder resin solids in one pass, and with about 7 percent in another pass, the resin being advanced to an intermediate stage of cure at the end of each such pass.

Other and further objects of the present invention will be apparent from the following description and claims which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 3 is a fragment of a bearing strip as prepared under prior practice;

FIG. 4 is a sectional view on the line 4—4 of FIG. 3;

FIG. 5 is a fragment of a bearing strip prepared under the present invention;

FIG. 6 is a sectional view taken on the line 6—6 of FIG. 5;

FIG. 7 is a sectional view illustrating further aspects of the present invention; and FIG. 8 is a series of reproductions from photographs illustrating the extent of flashing in laminants fabricated in different ways.

Figure 1:
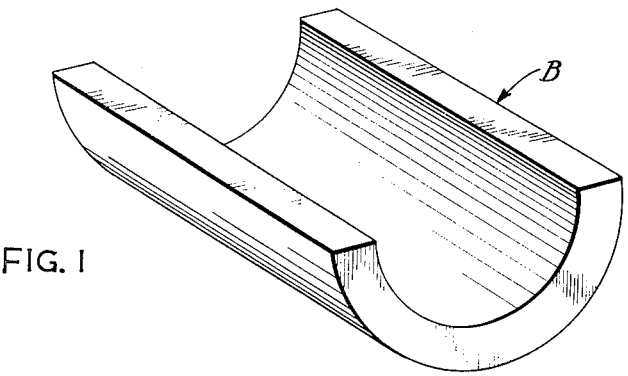
FIGS. 1 and 2 are elevational perspectives of two different bearings B in which the present invention may be embodied.
Figure 2:
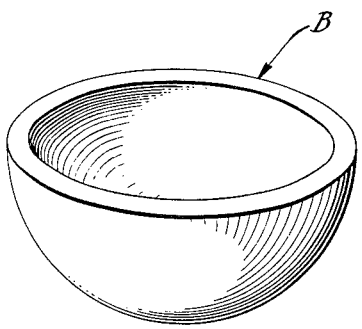

The present invention relates to bearings, such as B, FIGS. 1 and 2, composed of fabric treated with a binder resin containing finely divided natural lubricant. The lubricant so employed may be natural crystalline graphite such as Ceylon or Madagascar type, each particle measuring on the average 2 to 4 microns diameter, since we have found that by using such lubricant in a state of such fine sub-division, a sufficient distribution for lubricating purposes can be obtained without weakening the resin bond for the fabric of which the bearing is composed.

The particular fabric to be selected depends of course upon specific application, inasmuch as this has no effect on the empirical relations that are here involved either in connection with the graphited resin impregnant solution or the two-pass procedure that is involved in treating the fabric therewith. Consistent with the desire for long wearing characteristics, we prefer to use an unsized, heavy duty balanced fabric, that is, equally strong in both directions, such as an Army duck which is a well known tight, closely woven cotton fabric subscribing to the following specification Weight per square yard—12.55 oz.
Yarn size—warp 10/3 ply; fill 12/2 ply
Ends per inch—48; picks per inch—36
Tensile strength—Warp 250 lbs; fill 145 lbs.

Under the present invention, a web of canvas duck of the above kind is coated with a 60 percent solids solution in alcohol of a conventional phenol-formaldehyde resin containing a solid lubricant such as graphite in admixture. It is to be stressed that the bond strength is low if the total weight of the treating mixture in the fabric stock is as low as 30 percent, and on the other hand excess flow occurs if the total is as high as 45 to 50 percent. It is likewise important that the total volatile content of the treated fabric at the end of each two-stage preliminary cure be maintained at a relatively critical value, namely, about 4 percent as defined hereinafter, for if the volatile content of the partially cured resin solution is as low as 3 percent there is insufficient flow of resin to achieve the desired bonding during final cure, and if the volatile content is higher than 4 percent excessive resin bleeding occurs during final cure.

The actual coating of the fabric material must be carried out in a multi-step procedure if a bearing of enhanced characteristics is to be produced under and in accordance with the principles of the present invention, and it is important that the major quantity of the bonding resin-solid lubricant mixture be picked up in the first pass. Thus, in accordance with otherwise conventional procedures for producing bearings of the kind here involved, the fabric of which the bearing is to be composed undergoes, in the preferred form, an initial run or pass through the treating liquid containing solid lubricant so as to occlude or pick up 35 percent by weight solids, resin and graphite. Then, the phenolic solvent is removed, and the resin advanced to phenolic "B" stage by heat, as evidenced by approximately 4 percent resin volatile analysis. By 4 percent volatile is meant a 4 percent loss in weight of a moisture-free sample of the fabric containing the partially cured resin after being heated at 325° for ten minutes.

At this phase of production, the coated fabric is unsuitable for molding to produce a finished bearing, because the resin will undergo excessive flow under heat and pressure during the course of final cure causing undesired graphite migration. Therefore, in accordance with the present invention, the fabric stock, after the inital or first-run graphited resin content has been advanced to the phenolic "B" stage, is then re-run so as to raise the graphite-resin solids content in the fabric from about 35 to about 42 percent by weight, and the fabric containing resin is again cured by heat short of its infusible stage, as evidenced by 4 percent volatile.

Since an analysis for volatile content at this stage will represent both first and second pass resins, this means that the first pass resin has been cured beyond the state characterized by the initial test for 4 percent volatile, while the second pass resin will have a somewhat greater volatile content. Thus, during the second-pass cure there is further reduction in volatile of the first-pass resin, and in this way, the major proportion of graphite or equivalent solid resin is firmly set and anchored against subsequent migration. While the graphite of the second pass is not so set, this is not a great amount and moreover it is desired that the outer resin areas be flowable, as is inherent in the higher volatile content thereof, so as to bond readily during the final cure to produce the bearing.

As was mentioned above, the resin binder in the present instance is a conventional phenol-aldehyde resin composition ordinarily used for laminating purposes. Equivalent thermosetting resins can of course be used, and a phenolic is exemplary in all occurrences herein.

The following is a specification of a phenol-formaldehyde resin that may be used in practicing the present invention.

Specific gravity—1.600 to 1.065 at 25° C.—60% nonvolatile in denatured alcohol.

Resin content—60%, plus or minus 1% in ethyl alcohol by ASTM D115–41 non-volatile test, or by cure loss test (a) hereunder.

Volatility—

(a) *Cure loss:* 40% plus or minus 1%, two hours at 160° C. Two closed top crucibles suspended in electric oven.

(b) *Loss at 315° C.:* 6% maximum, using one cure loss crucible from (a) heated for one hour.

(c) *Loss at 370° C.:* 11% maximum. Using second cure loss crucible from (a) heated for one hour.

Viscosity—350 to 450 centipoises at 25° C.

Hot plate set time—20 to 30 seconds at 160° C.

A resin of the kind specified above constitutes the basis of the treating liquid, and such, containing graphite in suspension, is as follows:

EXAMPLE 1

| Material: | Parts by weight, pounds |
|---|---|
| Resin (as specified above) | 234 |
| Alcohol solvent | 13.6 |
| Graphite (2 to 4 microns) | 10.0 |

After the liquid system containing the above materials has been pre-mixed, this is then utilized for treating the fabric web, strips of which may be subsequently assembled into a laminated structure of the desired thickness, using the cotton duck specified above in the desired dimension, mascerated and molded, convoluted and pressed or otherwise processed to afford a fabric bearing having a thick, flocculated graphite surface coating as will be explained in more detail hereinafter.

As was mentioned, the fabric is treated in at least two runs, and preferably two heating zones are used in each run to advance the phenolic resin to a "B" stage cure, that is, short of the infusible state. The fabric web to be treated is passed through the treating liquid at about 21 feet per minute, being drawn therethrough by squeeze rollers of the usual kind set at about 0.026". During this first pass, the fabric picks up resin and lubricant solids to the extent of about 35 percent of the weight of the fabric. In other words, the alcohol solvent does not enter into the calculations.

Following this first-run impregnation, the fabric is then heated in one zone at about 275° F. and then in a second zone at about 285° F. to remove solvent and to set the resin to its phenolic "B" stage, and this is evidenced by a volatile content analyzing about 4 percent as mentioned above.

After preliminary cure of the first-run resin containing graphite, the fabric is then re-run in a second pass through the treating station affording the same graphited resin liquid mixture used for the first run, and again there are two heating zones, the first at about 280° F. and the second at about 290° F. The squeeze rollers in this instance are set at the same spacing as in the first run, but the fabric is pulled through at a velocity of about 19 feet per minute. During this second run, the solids content aforesaid is raised from about 35 percent to the saturation point of about about 42 percent.

The fabric passed from the second heating zone in this second run should analyze about 4 percent volatile (total of first and second run resin). As was mentioned, this results in the greater amount of the graphite being fixed against flow, while the fabric is faced with some resin in a low degree of "B" stage cure, capable of flow and good bonding. Thus, the web at this stage will have a central area, between the yarns and the outer surfaces, of relatively stable resin fixing the graphite content in this central area in place, with the outer surface areas of the web on either side carrying "B" stage resin in a readily flowable state. This will be explained further below in connection with the drawings.

Individual fabric plies may be obtained and can be molded and bonded together in a conventional final stage mold and cure process, bonding being facilitated by the flowable resin on the outside of the plies. Resin saturation and ideal bonding is evidenced by a slight flashing or bead about the edges where the plies are joined and where the movable walls of the mold engage. The cure cycle in this instance is 300° F. for the first hour, and one additional hour per inch of molded thickness at 345° F., the pressure being maintained at 2,000 p.s.i.

Instead of an immediate final cure, the plies can be assembled and stitched together and later cured. Moreover, laminations are but one form since the stock can be mascerated and then molded, or wound in convolutions and cured in this form to final shape.

It is important to stress the significance of the multi-pass procedure. Merely adding to the fabric a 35 percent solids content in one pass will result in excessive flow of the resin material while undergoing cure in the mold with heat and pressure, and this produces also an undesired migration or shifting of the flocculated solid lubricant continuum layer. Such, however, is overcome by resorting to a second run procedure with the intermediate step of curing the first run resin about to its "B" stage as evidenced by a volatile content not to exceed about 4 percent as noted above, and also a second phenolic "B" stage cure. The second "B" stage cure produces further curing of the first stage resin, thereby firmly anchoring the graphite or other solid lubricant continuum phase in place against migration in the mold from an area of greater pressure to one of less in the bearing being produced.

It is moreover quite impractical to apply the total of 42 percent resin solids in a single pass, subsequently cured to the "B" stage, that is, 4 percent volatile content, without excessive resin flow and graphite migration during final molding under heat and pressure. What is more, it is not advisable to add the graphited resin much above 42 percent solids using more than two runs, because oversaturation occurs, and excessive flow and flashing is encountered during final molding and cure under heat and pressure. In an actual experiment involving three passes, a total graphited resin pick up of 48 percent solids was tried, and while the volatile content of the "B" stage resin was maintained at about 4 percent, excess resin containing solid lubricant exuded from the sample during molding under heat and pressure, as will be shown below.

The liquid system containing resin and lubricant solids used to coat fabric stock for bearings under the present invention is non-aqueous. This is in contrast to prevalent practices in this art wherein water is deemed important to the development of a low viscosity emulsion which will penetrate the individual yarns and threads that afford the basis for the Martello bearing. The difference can be emphasized by pointing out that such an emulsion can stand for days on end without the solid lubricant settling out, whereas the mixture represented by the foregoing example hereof when allowed to stand will separate comparatively quickly into a solid lubricant phase.

Typical of such prevalent practices in the art is Martello Patent No. 2,757,109 which specifies the use of a dispersing agent in the form of a sulfonate to "prevent flocculating of the solid lubricant"; and to assure that the graphite particles are maintained in suspension, Martello specifies a suspending agent in the form of carboxy methyl cellulose, or the equivalent. Such practices result in deep, thorough impregnation of the fabric yarns by the resin and lubricant solids. This is attempted to be shown in FIGS. 3 and 4 hereof wherein the warp and filler threads W and T, respectively representative of fabric treated with a water emulsion containing phenolic resin and lubricant solids as aforesaid, are shaded (FIG. 4) to represent such deep, thorough impregnations of the resin and lubricant solids into the threads or yarns. There is substantially no filling of the hollows under this known procedure, and each yarn is rather heavily coated on the exterior with bonding resin as will be apparent from FIG. 3. In fact, as shown in FIG. 3, the cross-overs or humps between the warp and filler threads are easily observable. During molding, the lubricant solids will not shift or migrate because they are confined in yarn matrices. On the other hand, they embrittle the yarns and reduce the resilience or flexibility thereof.

The treating solution under the present invention is non-aqueous and quite thick or viscous. As a consequence, the resin and lubricant solids do not penetrate the interior of the yarns to any marked degree. To the contrary, the resin vehicle (resin dissolved in alcohol) containing lubricant solids fills the hollows between the yarn warp and filler threads W' and T' as shown in FIG. 6 hereof, and penetrates the threads only to a minor degree as shown by the stippled threads W' and T', FIG. 6. The two resin coats are separated by parting lines PL, FIG. 6. The cross-overs or humps between the warp and filler threads are not apparent and in fact are hidden by the flocculant coat FC, FIGS. 5 and 6. It will be realized from this that prior to achieving final infusibility, the resin layers R, FIG. 6, containing the solid lubricant particles present as flocculations FC (FIG. 5) on the outer surfaces, can migrate or shift due to differential pressures during molding. This would result in an undesirable spectrum of solid lubricant density in the finished bearing. This would be undesirable because the bearing would display an infinite variation in friction characteristics throughout its useful life. Thus, as the undesirable fabric bearing wears, one area would soon be devoid of lubricant, then another area and so on. Such is avoided under the present invention by the two-pass and partial cure procedure described above. This is shown in more detail in FIG. 7 hereof. The first pass resin layer, FIG. 5, subjected to two partial cures (the cure concomitant to the first pass, and the subsequent cure when partially curing the second pass resin) is quite firmly secured in place along with the solid lubricant associated therewith. The second pass lubricant is not so far advanced or cured as the first-pass resin and hence is somewhat flexible (and the solid lubricant associated therewith) but this is desirable in order to secure an effective bond when strips of the kind shown in FIG. 7 are juxtaposed on one another and finally cured and consolidated under heat and pressure to complete the composite bearing. Even so, since the backing yarns or threads are substantially unpenetrated by the resin, these remain substantially flexible and resilient in the finished bearing.

The manifest physical effect and importance of two passes and two partial cures incidental to obtaining resin and solid lubricant pick-up in the fabric as above described, and schematically emphasized in FIGS. 3 to 7 in comparison to the Martello patent, can perhaps be appreciated in another way by reference to FIG. 8. FIG. 8A is reproduced from a photograph showing the state of 15 pieces (5" x 5" x ¼") of laminated canvas stock CT treated by one pass only to pick up 35.8% by weight of phenolic resin in alcohol containing graphite solids, under controlled volatility (4%) as above described. When compressed under given conditions of heat and pressure (1500 p.s.i. and 325° for 15 minutes) extensive areas of flashing FL result at the edges of the laminant.

FIG. 8B is also reproduced from a photograph. This material is the same in composition and dimensions as FIG. 8A except the "one-pass" (one immersion of the resin-graphite liquid followed by partial cure to 4% volatile) stock (15 plies) of FIG. 8A was treated a second time to increase the total resin-solids lubricant pick-up to 42% while partially curing again to 4% volatile. Thus, during the second stage immersion followed by partial cure to 4% volatile, more treating material (resin plus solid lubricant) was added in comparison to FIG. 8A, yet under the same degree of given heat and pressure scarcely any flashing FL' is visible: just enough to characterize the desired degree of resin flow sufficient to assure a good ultimate bond effected by heat and pressure among the plies.

FIG. 8C is also reproduced from a photograph and shows the completely unexpected result of attempting to add additional resin and solid lubricant by a third pass and partial cure to 4% volatile. The flashing FL" is more severe than in FIG. 8A. In FIG. 8, all materials, treating compositions and pressing conditions are the same. Stated in other words, the only difference is the number of immersions followed by partial cure to 4% volatile, and the time of immersion in the resin-graphite liquid (alcohol) mixture was the same for each pass.

It was mentioned above that a laminated bearing produced under the present invention is more resilient in comparison to one prepared in accordance with the prior art. This is so because prior art practices will result in thorough, deep penetration of bonding resin and lubricant solids into the interior of the threads or yarns composing the fabric backing. To demonstrate this, there was prepared an impregnating suspension in accordance with United States Patent No. 2,757,109 as follows:

(a) Sodium hydroxide, 0.1 part by weight, and 0.3 part by weight of calcium lignin sulphonate were added to and dissolved in 3.9 parts by weight of water.

(b) Carboxy methyl cellulose, 0.4 part by weight, was added to and dissolved in 11.7 parts by weight of water.

(c) To 80 parts by weight of a water solution of an A-stage phenol-formaldehyde resin of the type described in Patent No. 2,579,637 (75% solids), there was added with stirring (a) and (b) above.

(d) To (c) above was added 3.85 parts by weight of finely divided graphite lubricant, producing the suspension specified in United States Patents No. 2,757,109, except for a less percentage graphite in order to have present the equivalent percentage of graphite specified in Example 1 above.

Cotton fabric was first immersed in suspension (d), partially cured, then was immersed for a second immersion in the resin-alcohol blend of Example 1 above (devoid of graphite), and then partially cured for the second time. This is the X–1 material of Table I below. Separate cotton fabric of identical kind was processed in accordance with the two-stage technique of the present invention, while using for both immersions the treating material of Example 1 above. This is the X–2 material of Table I below. The partial cures for both materials, however, were selected so that both materials would display the same degree of resin flow when finally press cured.

Table I

|  | X–1 Material | | X–2 Material | |
| --- | --- | --- | --- | --- |
|  | First Immersion | Second Immersion | First Immersion | Second Immersion |
| Solids Pick-up, percent | 34.4 | 44.9 | 34.3 | 44.7 |
| Resin Ratio | 1.53 | 1.82 | 1.51 | 1.80 |
| Volatiles, percent | 6.74 | 4.58 | 4.36 | 5.34 |
| Resin Flow, percent |  | 10.3 |  | 10.7 |

In preparing the X–1 and X–2 materials to compare resilience, every effort was made to treat the fabrics to obtain equivalent total resin contents, or in other words, the only significant difference was the fact that the materials for the first immersions of the two fabrics differed. Of course, the X–2 material (the present invention) has more solid lubricant present, which is a characteristic feature of the present invention manifest in an extension of lubricity, but lubricity, or extended lubricity characteristics were not involved in the test. In fact, the presence of more graphite solids in the X-2 material, if anything, should produce a material having less resilience in comparison to the X-1 material. The contrary state, however, was found as will be shown below.

Thus, it will be noted from the above data that the one significant variation is the employment of a water soluble phenolic resin as the first immersion of the X-1 material. It may be further explained that "flow" in Table I means the percent of resinous material exuded from a given area of fabric after a full press cure, based upon the total fabric weight.

Resilience, or ability to recover rather than take on a permanent set after stressing under load, is important in a bearing, particularly in bearing materials used in ball joint suspensions of automotive vehicles, where contact pressure can be extremely high. The X-2 material above, representing the present invention, deflected more and recovered more, demonstrating the greater tendency against permanent set, under given loads, in comparison to the X-1 material. The comparative results are as follows:

Table II

| Load, #/in.² | X-2 Material | | X-1 Material | |
|---|---|---|---|---|
| | Deflection, inches | Recovery, inches | Deflection, inches | Recovery, inches |
| 5,000-10,000 | 0.017-0.042 | 0.000-0.001 | 0.020-0.041 | 0.000 |
| 10,000 | 0.042 | 0.001 | 0.041 | 0.001 |
| 15,000 | 0.060 | 0.002 | 0.051 | 0.002 |
| 20,000 | 0.078 | 0.004 | 0.065 | 0.003 |
| 25,000 | 0.099 | 0.008 | 0.082 | 0.004 |

It will be seen from the foregoing that fabric material characterizing a composition bearing constructed under the present invention bears two separately processed resin coatings that are in intimate contact one with another. The resin is of the alcohol-soluble phenolic type and finely divided solid lubricant particles, such as graphite, molybedenum sulfide or the like are contained therein, and when this mixture is coated on the fibers the latter are substantially unpenetrated by the coating material. This first coating or immersion when partially cured affords the first coating, and by repeating the procedure a second coating is produced having intimate contact with the first coating.

The above generalized procedure produces a bearing that is different in kind from one wherein the solid lubricant particles are technically dispersed or suspended in an aqueous resin vehicle, since such an aqueous coating mixture will penetrate the fibers so that the fibers become thoroughly and uniformly saturated throughout by the resin and the lubricant particles. Therefore, as shown above, a material produced in this manner is less resilient than that produced under the present invention. Furthermore, the solid lubricant particles in the present bearing are flocculated or condensed as distinguished from the substantially uniform dispersion or suspension contemplated, for example, in United States Patent No. 2,757,109, and because of this flocculation, which is desirable, it becomes important to anchor the condensed graphite or other solid lubricant particles agglomerations against shifting or migration when subjected to the actual pressures of field use. This we accomplish under the present invention and hence while we have illustrated and described preferred embodiments of the present invention, it is to be realized that these are capable of variation and modification, and we therefore do not wish to be limited to the precise details set forth, but desire to avail ourselves of such changes and alterations as fall within the purview of the following claims.

We claim:

1. In a method for producing bearings comprising a closely woven cotton fabric bonded by a thermosetting resin and containing particulated lubricant, first passing the fabric through an alcohol solution of uncured phenolic resin containing solid lubricant particles to surface coat without substantially impregnating the fabric with a selected amount of said resin and lubricant, curing the first-pass resin in the fabric short of its infusible state, passing the fabric again through an alcohol solution of uncured phenolic resin containing lubricant to further coat the fabric with more of the resin and lubricant, and then curing the second-pass resin applied to the fabric short of its infusible state to set the first-pass resin and lubricant firmly against migration.

2. A method according to claim 1 wherein the lubricant is selected from the group consisting of graphite and molybdenum sulfide.

3. A method of producing a bearing composed of a closely woven cotton fabric surface coated with a thermosetting resin and including particulated lubricant uniformly distributed therethrough and comprising, coating said fabric in one pass with an alcohol solution of uncured phenolic resin containing particulated lubricant so as to surface coat without substantially impregnating said fabric with about 35 percent by weight of resin and lubricant solids, partially curing the first-pass resin to substantially its phenolic B stage as evidenced by about 4 percent resin volatile, further coating said fabric in a second pass with more of said resin containing particulated lubricant so as to raise the resin and lubricant content in the fabric to a saturable point, and curing the second-pass resin short of its infusible state as evidenced by about 4 percent resin volatile, to set the first-pass lubricant firmly in the fabric.

References Cited by the Examiner

UNITED STATES PATENTS 2,631,961  3/1953  Antheil _____ 156—310
2,757,109  7/1956  Martello _____ 156—335

EARL M. BERGERT, *Primary Examiner.*

ALEXANDER WYMAN, *Examiner.*